United States Patent Office 3,681,040
Patented Aug. 1, 1972

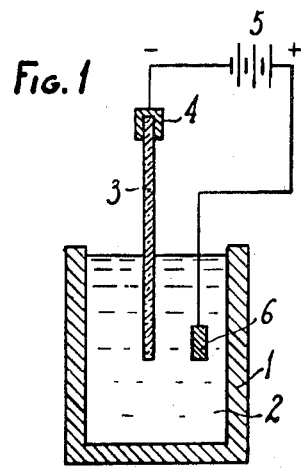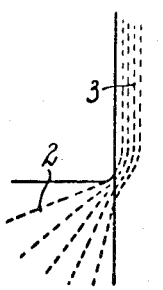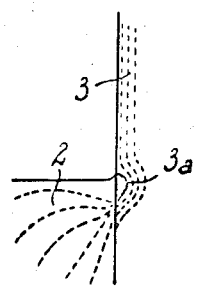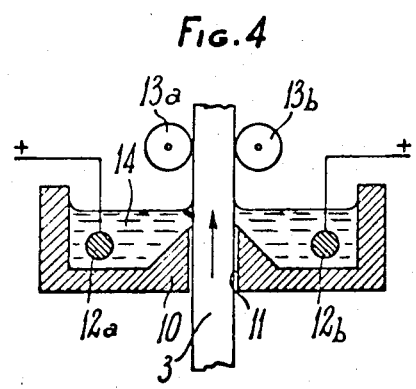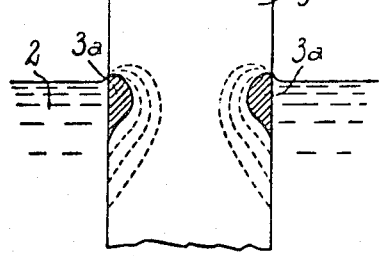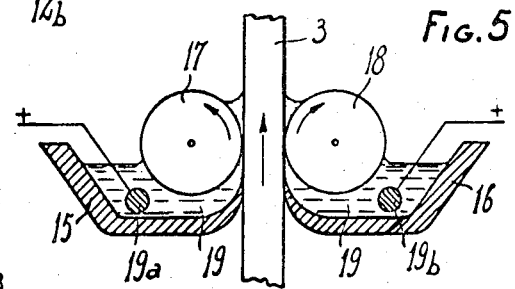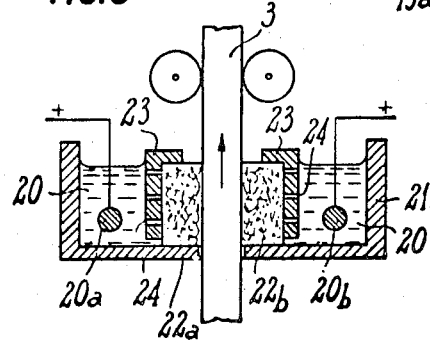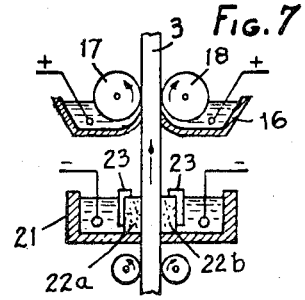

3,681,040
PROCESS AND APPARATUS FOR TEMPERING OF GLASS BY ELECTROCHEMICAL ION EXCHANGE
Jean-Marc Pierre-dit-Mery, Serquigny, France, assignor to Compagnie de Saint-Gobain, Neuilly-sur-Seine, France
Continuation of application Ser. No. 536,954, Mar. 22, 1966. This application July 10, 1970, Ser. No. 54,019
Claims priority, application France, Mar. 26, 1965, 10,859
Int. Cl. C03c 21/00
U.S. Cl. 65—30                                            19 Claims

ABSTRACT OF THE DISCLOSURE

Process and apparatus for the surface tempering of both sides of a glass article by electro-chemical ion exchange including mounting a positive pole of a D.C. voltage to baths of molten salts such as potassium nitrate on both sides of the article, connecting the negative pole to a portion of the glass article outside of the molten bath, maintaining the glass article at a temperature to place the glass article in an electrically conductive state, and applying the voltage for a time period sufficient to attain ion exchange on both surfaces of the glass article.

---

This application is a continuation of my prior application Ser. No. 536,954 filed Mar. 22, 1966, now abandoned which application claims priority from my application filed in France Mar. 26, 1965 Ser. No. 10859.

This invention relates to a method and apparatus for the strengthening or reinforcement by ion exchange, of vitreous material, particularly glass.

It is known to reinforce vitreous articles, especially glass, by the establishment of compression in the surface layers of the article, for example, by a preliminary heating of the article throughout, to about its softening temperature, followed by a rapid cooling of the surface layers thereof. This method is known as thermic tempering. It is also possible to obtain a state of compression in the surface layers of an article of glass or other vitreous materials, by forming the article with a certain heterogeneity in chemical constituency, between the surface layers of the glass and its inner or inside layers.

The heterogeneity may be attained notably by cementation, that is, by replacement of a part of the ions originally comprising the surface layers of the glass, by ions of a different kind. A typical example of such procedure consists in the replacement of $Na^+$ ions of glass, by $K^+$ ions which, being larger, result in the desired compression by reason of the fact that the substituted $K^+$ ions are constrained to occupy a space formerly occupied by $Na^+$ ions.

The desired compression and strengthening of the surface layers of the glass may also result from the fact that, apart from their relative dimensions, the kind of ions exchanged is such that the coefficient of thermal expansion of the glass in the surface layers thereof, becomes less after treatment than the corresponding coefficient of the internal layers. Thus the desired compression of the surface layers is created in response to cooling of the glass.

Whatever type of cementation is selected, the substitution of ions is produced by thermic diffusion, that is to say, by the immersion of the glass article in a medium containing the ions to be exchanged, such as a molten salt, which yields a part of its ions to the glass while an equal number of different ions migrate from the glass to the medium or bath.

The procedure described in the foregoing paragraphs has the important drawback that the rate of thermic diffusion is always slow. This is especially true when it is necessary to operate at a moderate temperature as, for example, below the strain point of the glass. The rate of diffusion is even slower if the ions which are to migrate into the glass are larger than those which emerge in exchange.

It is possible to increase the rate of diffusion in several ways as, for example, by operating at higher temperatures. But this requires glass having a particularly high strain point. It is equally possible to effect diffusion by the exchange of ions in an eletcric field. In such operations the article to be treated may be a soda lime glass in a molten bath of potassium nitrate for example. The article is so disposed that it constitutes a sort of diaphragm separating the bath into two compartments, anodic and cathodic. The electric field is essentially perpendicular to the surface of the glass, thus promoting penetration of cations of potassium, for example, from the bath into the glass on the anodic side, and the migration of an equal number of ions of like sign from the glass on the cathodic side.

While the rate of migration of ions may be thus increased over the thermic procedure previously described, there is also a disadvantage because the application of an electric field greatly alters the nature of the diffusion of the ions. In a purely thermic diffusion the migration of ions due to the Brownian movement is uniform so that both of the immersed surfaces of the glass are treated equally and at the same time. On the other hand, where an electric field is present, the cations on the anodic side migrate from the bath into the glass, while on the cathodic side they migrate from the glass into the bath. The result is that only one surface of the glass article may be thus treated. Theoretically it is possible to treat the second surface by reversing the sense of the eletcric field, for example, during the final third of the total period of operation. However, this procedure is obviously detrimental because it effects deterioration of the desired strengthening previously produced in the first surface of the article. There are other drawbacks which are not encountered where symmetrical and simultaneous treatment of both surfaces is carried out by thermic procedure alone. For instance, where the glass article is required to act as a diaphragm in an electric field, it is not possible to treat completely the edges of the article or areas adjacent thereto, so that there results a heterogeneity which, for example, creates relative weakness of the glass at and adjacent these edges. In short, the electric field method of ion exchange as presently practiced, is essentially limited to one surface of the article; and procedures intended to overcome and obviate this drawback, are not satisfactory.

The present invention has for its chief object the provision of a method of surface treatment of articles of glass or other vitreous materials, by diffusion of ions in an electric field, in such a manner that the ions in both surfaces of the article are simultaneously replaced by ions of a different kind, in a perfectly uniform and symmetrical way, irrespective of whether the article is a tube, plate or sheet.

Another object is to provide a method of glass reinforcement by means of an electric field, that is relatively fast in operation, and commercially and economically acceptable and practicable.

Other objects and advantages will become clear to those skillled in the art, after a study of the following detailed description.

In accordance with the invention it is possible to treat the entire surface of a glass article, for example, with complete uniformity and, under certain conditions, to so treat articles of indefinite length, such as glass ribbons, tubes, rings, etc. More specifically, the inventive method consists in treatment or cementation of the surface layers of a glass article in an electric field, by electrically connecting at least one area of the article to one pole of a source of direct current and to put at least another area of the article in contact with a source of ions to be introduced into the glass, or in contact with a source of ionizable atoms capable of supplying such ions. The aforesaid source of ions is then connected with the second pole of the source of current and the surface of the article is progressively moved so that successive areas thereof pass in contact with the ion source, which is maintained during the treatment, at a temperature sufficient to render it electrically conductive. The polarity of the glass article on the one hand, the ion source on the other, is so connected with the source of direct current, that ions of the desired kind migrate into the glass.

The principle of operation will be readily understood by referring to the accompanying drawing in connection with the detailed description. In the drawing:

FIG. 1 schematically depicts a simple form of apparatus for introducing, for example, potassium ions into the surface layers of a soda lime glass;

FIG. 2a is a schematic view showing the paths of ion migration at the start of treatment;

FIG. 2b is a view corresponding to FIG. 2a, but showing the paths of ion migration after the treatment has progressed for a period of time;

FIG. 3 is an enlarged diagrammatic view corresponding to FIG. 2b, showing how both sides of a sheet, plate, or ribbon of glass, are simultaneously treated and reinforced;

FIG. 4 is a central vertical section through one form of apparatus for carrying the method into practice;

FIG. 5 is a central vertical section through a second form of apparatus;

FIG. 6 is a central vertical section through a third form of apparatus;

FIG. 7 is a section corresponding to FIGS. 5 and 6, of an apparatus combining the structure of these figures;

Figure 8:
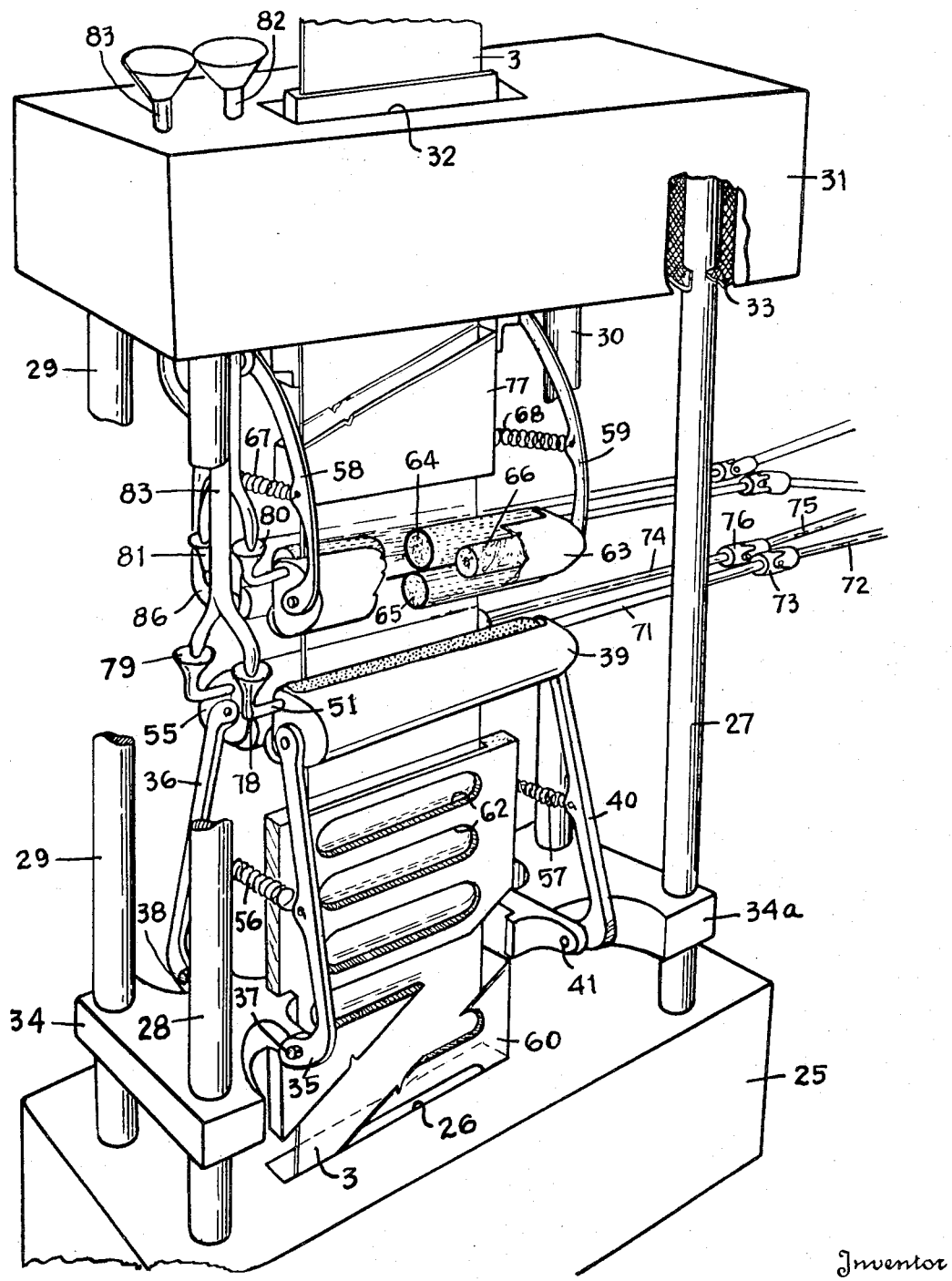
FIG. 8 is a perspective view of a commercial embodiment of a machine for carrying the method into practice.

Referring to FIG. 1, 1 identifies a container for a bath 2 of molten potassium salt and in which there is immersed an article 3 of glass, suspended by any appropriate means 4. Suspension 4 is connected with the negative pole of a source 5 of direct current. The positive pole of the source is connected with an electrode 6 immersed in the bath. Because of the fact that the conductance of the glass is very low over the portion thereof immersed within the bath, the lines of force of the electric field emanating from electrode 6, pass exclusively within the liquid bath rather than through the portion of the glass sheet immersed therein, and penetrate the glass only along the line of contact of the glass with the surface of the bath. Above this line of contact the lines of force of the field pass through the glass to the supporting means 4.

The potassium ions have a tendency to move along the lines of force from the bath toward the line of contact of the glass, where they migrate into the glass. At the liquid surface line, the replacement of the sodium ions by potassium ions, increases the resistance, so that the lines progressively penetrate deeper into the subjacent layers of the glass. FIG. 2a illustrates the condition at the beginning of treatment of an increment of length of article 3, measured normal to the surface of the bath. FIG. 2b shows the condition after a period of treatment, wherein 3a identifies a portion of the surface layer of glass article 3, wherein sodium ions have been replaced by potassium ions; and from this figure the course or path of the lines of force in detouring about the reinforced surface portion or increment 3a of higher resistance, is clearly apparent. It will be understood, of course, that as article 3 is progressively moved vertically within the bath, the reinforced portion 3a is continuously built up for each increment of length and results in a reinforced surface layer of the glass, of uniform density and thickness. This thickness will depend upon the rate of movement of the article within the bath, the voltage of source 5, the kind and temperature of the bath, and other variables. By proper adjustment of the rate of movement, reinforcement or cementation of the glass on both surfaces thereof may be effected to a desired depth. This is clear from inspection of FIG. 3 where the curved dotted lines indicate successive paths of the lines of force of the field as the thickness or depth of reinforcement of the surface layer increases.

Thus, as the article 3 is progressively moved vertically relatively to the bath, for example, downwardly, in such a way that the line of contact of the surface of the molten bath with the glass article traverses the two surfaces thereof, these surfaces are identically and simultaneously processed by enrichment with potassium ions, to a depth which is a function of the current intensity, rate of movement of the article, and composition of the glass. The method inherently assures symmetry and uniformity of treatment and the results previously enumerated. It enables uniformity of treatment simultaneously on both surfaces, and by the progressive movement of the article relatively to the bath, assures that the reinforcement or cementation is uniform over these surfaces.

It might be thought that because of the fact that ion migration takes place only along a relatively narrow area adjacent the line of contact of the surface of the bath, with the article under treatment, the method is no commercially practicable because of the time factor involved. But experience has shown that because of the higher current densities which can be used due to the dissipation of heat by the Joule effect, it is possible to carry out the method in times which are compatible with commercial requirements and, in any event, much less than those required for corresponding treatment using purely thermic diffusion.

It will be understood that FIG. 1 is purely schematic and shows only one of numerous ways of carrying the new method into effect; and that many variations thereof are possible. The molten salt bath 2 of FIG. 1 comprises the anodic compartment for the source of ions and is of utility only in the region adjacent the level of the molten bath therein, where ion exchange is taking place. Where articles of large size are to be treated, the set-up shown upon this figure requires a bath of excessive depth and one which is expensive to construct and supply, and difficult to maintain at the required elevated temperature. Furthermore, the bath there shown does not permit the treatment of articles such as a continuous ribbon or tube of glass. In such cases it is preferable to limit the size of the bath to an active zone, that is to say, to a zone encompassing only the area adjacent the surface of the bath.

In such cases the bath may have the form of a shallow rectangular basin such as 10, FIG. 4, provided in the central portion of its bottom, with an aperture 11 having dimensions a little greater than those of the transverse section of the sheet of glass 3. This basin contains the liquid 14, such as molten potassium nitrate, in contact with the glass 3 above the level of the aperture 11. Rollers 13a and 13b act to guide and propel the sheet.

The bath is positively charged by one or more electrodes 12a and 12b immersed therein.

Advantageously the aforesaid rollers may be only partly immersed in the liquid bath as shown upon FIG. 5. This figure also depicts a modified form of shallow basin with side walls 15 and 16 containing the bath of molten salt 19. Rollers 17 and 18, being partially immersed in the molten salt, promote good electrical contact between the glass and the bath. Electrodes 19a and 19b act to polarize the bath in each channel, respectively.

It will be noted that in the invention as depicted upon FIG. 4, the two side edges of the sheet are treated, as well as the two opposite faces thereof. In the construction shown upon FIG. 5, only the two principal surfaces or faces of the sheet are treated; but it is possible, if desired, to obtain the capillary effect upon the side edges thereof to correspondingly obtain the benefits of the treatment thereon.

In the construction of FIG. 6, the glass is wet by passage between two tampons 22a and 22b positioned in the bath of molten salt 20 within container 21. These tampons may consist of fibrous material such as glass wool, for example, and are held in place by elements 23 adjustably fixed within the container. The liquid passes to the tampons, to saturate them, through apertures 24 in the elements. These elements and the tampons collectively form a gland, and may be easily constructed and arranged so that both surfaces of the ribbon or sheet, as well as the side edges thereof, may be treated at one and the same time. One or more electrodes 20a, 20b, are utilized to polarize the bath.

In the construction wherein the glass is wet by capillarity, such as have been described previously, it is preferable, in order to counteract any tendency of the liquid to escape downwardly, as through aperture 11, to move the ribbon upwardly as indicated by the arrows, FIGS. 4, 5 and 6. The mechanism for wetting the glass by capillarity, shown in these figures, is intended in substitution for that shown by FIG. 1; but it is possible to combine the devices of FIGS. 5 and 6, using one as a second electrode for example, connected with the negative pole of the source, and in substitution for the contact 4, FIG. 1.

It should be noted that the arrangement of the two liquid baths, as shown upon FIG. 7, are so related to the direction of travel of the sheet or ribbon of glass, that the latter first passes through the cathodic bath, then through the anodic. With a reverse arrangement there is danger of extracting from the glass in the cathodic bath, some of the migrated ions previously supplied to the glass by the anodic bath.

As shown upon FIG. 7, the anodic compartment comprises a bath of molten salt as in FIG. 5. The glass is connected with the cathode by an electrode means of the type shown in FIG. 6. The conducting liquid in compartment or container 21 may be a metal in liquid state, an amalgam, a solution of an electrolyte, or a molten salt. In the latter case the salt may be the same as that in the anodic compartment. The bath in container 21 should preferably be chemically inert with respect to the glass, and capable of fixing the sodium which would otherwise attack the glass. The two sets of guide rolls which also propel the glass, upwardly in the figure under discussion, are preferably located, one above the anodic or upper compartment and the other below the lower or cathodic compartment. This has the advantage that the two compartments may be closely adjacent so that the path of the current through the glass is short, and the loss due to the Joule effect is kept low, so that substantially the entire potential difference is usefully employed.

From a thermodynamic viewpoint, and in case one of the anodic or cathodic compartments comprises a bath, it may be that the heat loss to the air is more rapid than the heat supplied to the bath. It is not a matter of great importance whether the sheet of glass is moved upwardly out of the bath or, on the other hand, progressively translated downwardly therethrough, provided of course, that the cathodic bath is first in the direction of translation. In each case the polarity selected for the electrode constituted by the bath, is one which will enable attainment of the optimum temperature for the treatment.

In case the procedure is continuous, where the bath is not of large dimension, as in the construction of FIG. 7, the regulation of the temperature of the sheet may be effected by blowing air or other gas at suitable temperature upon the glass, or by immersing the glass in a suitable bath of inert material.

The following example will illustrate how the improved method is carried out and the results attained with a plate or sheet of glass of ordinary composition and which is reinforced by the migration of potassium ions in accordance with the invention.

A bath of potassium nitrate is maintained molten at a temperature of about 425° C. At the start of the procedure the sheet is completely immersed in the bath and is progressively extracted therefrom by a pair of anodic rollers which impart a vertical translation to the sheet. These rollers are wetted by the molten potassium nitrate, as depicted upon FIG. 5. The rollers may be of glass covered with a layer of tubular fabric of glass fibers and wetted by the molten salt in the container. The rollers and coverings thereof may be of a glass resistant to breakage by heat, such as the glass sold under the trade name of "Pyrex." The rate of translation of the sheet or ribbon is about 12 cm./hr. The length of the sheet is about 90 mm., resulting in a total time of treatment of about 45 minutes. The voltage employed is about 150 to 180 and the current about 80 milliamperes. After treatment the characteristics of the glass were:

Tension at the center of the specimen: 2.5 fringes for 4 cm. of glass, or 136 kg./cm.$^2$ of tension.

The thickness affected by the treatment, calculated from the consumption of electricity, assuming that all the sodium has been replaced by potassium as a result of the treatment: 30 microns.

Thickness determined by a polarizing microscope: 30–40 microns.

Calculated surface compression: 4950 kg./cm.$^2$±100.

Comparative results measured in strength of the test pieces:

Bending strength measured by bending forces applied circularly by four rollers:

(a) Standard test pieces, industrially annealed: Average value of point of rupture: 800 kg./cm.$^2$; maximum resistance to rupture: 1000 kg./cm.$^2$.

(b) Test pieces treated by purely thermal diffusion for 72 hours at 400° C. in $KNO_3$ (five tests): Maximum resistance to rupture: 4200 kg./cm.$^2$.

(c) Test pieces of this invention (45 minutes treatment): Average value of point of rupture: 5400 kg./cm.$^2$; maximum resistance to rupture: 5875 kg./cm.$^2$.

Composition of blass treated in percentages by weight: $SiO_2$—72.50; $SO_3$—0.22; $Fe_2O_3$—0.12; $Al_2O_3$—1.20; CaO—8.20; MgO—3.62; $Na_2O$—14.10; $K_2O$—0.03.

In general, the device of FIG. 1 is used for the treatment of small articles, while those of FIGS. 4 through 7 are more especially adapted for the treatment of larger articles, in particular, those of indefinite length. It will be clear that a glass article may be treated by the invention, successively at various stages of production, at greater speeds for each treatment, where production procedures make this desirable. The total increase in strength will then be equal to that obtained by a single treatment of prolonged duration.

Referring to FIGS. 8 through 14, there is shown a commercial form of the apparatus. A base 25 has a central slot 26 extending vertically therethrough. Four posts or columns 27, 28, 29 and 30 have their lower ends fixed in the base at the respective corners of a rectangle and, at their top ends are fixed to and support a metal cap or block 31. This block has a central slot 32 vertically aligned with slot 26. As indicated at 33, FIG. 8, by way of example, each of columns 27, etc., is electrically insulated from block 31. In actual practice a sheathing of thermal insulation surrounds the blocks and encloses all parts positioned between them, as is subsequently explained.

A first plate 34a has apertures at its corners each slidably receiving a respective one of posts 27 and 30 to provide for vertical adjustment of the plate and parts carried thereby. Likewise, a second plate 34 is mounted for vertical adjustment on and along columns 28, 29. Plates 34, 34a are rigidly interconnected by a plate guide 60, subsequently described, so that they are constrained for vertical adjustment as a unit, on and along the columns. Means not shown may be provided to additionally connect plates 34, 34a, and to positively adjust them vertically through a limited distance.

A first pair of arms 35, 40, are pivoted at their lower ends to plates 34 and 34a, respectively, as indicated at 37 and 41, on a first common horizontal axis. Likewise a second pair of arms, only one of which, 36, appears upon FIG. 8, are pivoted at their lower ends as indicated at 38, to plates 34 and 34a respectively, on a second horizontal axis parallel with and laterally offset from the aforesaid first axis.

Figure 9:
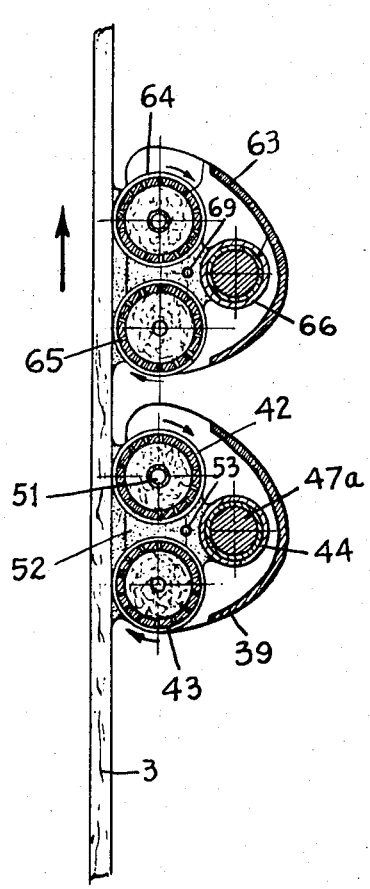
FIG. 9 is a vertical section through a set of rollers effective to make contact with one surface of a sheet or ribbon of glass.
Figure 11:
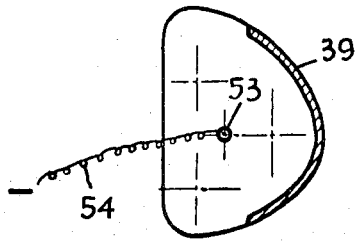
FIG. 11 is a view of another portion of FIG. 9, showing the cathode connection for the lower rollers thereof.
Figure 14:
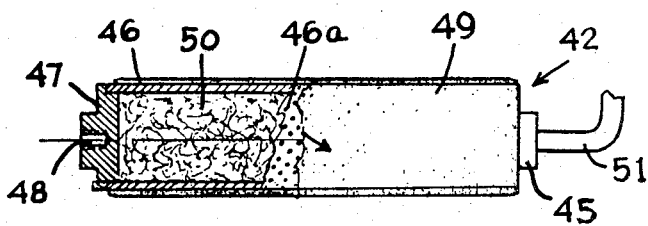
FIG. 14 is a view partly in axial section, of one of the electrode rollers used in the machine shown upon FIG. 8.

At their top ends, arms 35 and 40 are pivotally connected with the respective end walls of a trough-shaped hood or casing 39 which also appears upon FIGS. 9 and 11; and from these figures it is noted that the hood has generally semicircular end walls integrally connected by a generally semi-cylindrical trough. The end walls of the hood have bearings which journal the respective ends of three rollers 42, 43 and 44. Referring more particularly to FIG. 9, it is seen that rollers 42 and 43 are essentially alike except for a minor detail hereinafter described. Thus a description of roller 42 will suffice for both. Referring to FIG. 14, roller 42 comprises a hollow metal cylinder 46 which may be of aluminum, having its walls pierced with a multiplicity of closely-spaced apertures 46a over its entire surface. One end of this cylinder is closed by a plug 47 fixed thereto and having a central shaft connection opening 48. A second plug 45 closes the other end of the cylinder but differs from plug 48 in having a central opening therethrough in which a bearing tube 51 has a smooth fit and passes to the interior of the cylinder.

Cylinder 46 is covered with a layer or sleeve 49 of woven glass fibers. The interior of the cylinder is filled with glass wool as indicated at 50. As shown at FIG. 14, bearing tube 51 extends outwardly and upwardly to terminte in an upwardly-facing funnel into which molten salt or other conductive liquid may be introduced. The liquid passes through tube 51 to the interior of the cylinder, permeates the mass of glass fibers 50, seeps through the apertures 46a in cylinder 46 and passes by capillarity to and between the interstices of fabric covering 49 into contact with the sheet of glass. Roller 43 is essentially a duplicate of roller 42, except that it has no tube such as 51. In other words, both ends of roller cylinder 43 are like plug 47 of roller 42.

Third roller 44 is differently constructed and may consist simply of a hollow metallic cylinder having its ends closed by bearing plugs such as the one shown at 47a FIG. 9, and covered with a sheathing of metal, such as aluminum. Reference to this figure shows that rollers 42, 43 are disposed in closely-adjacent vertically-spaced relation within casing 39, for unobstructed contact with sheet of glass 3. Auxiliary roller 44 is mounted with its axis of rotation parallel with rollers 42 and 43 and in a horizontal plane midway between the axes of these rollers.

As also well shown upon FIG. 9 the three rollers are so related that a body of molten salt, indicated at 52, is maintained between them by capillarity. Referring also to FIG. 11, an electrode 53 is mounted at its ends by electrical insulation, in the end walls of hood 39, and extends through the body of liquid 52 in electrical contact therewith. A lead 54 extends to and is connected with one end of the electrode to connect it with a source of D.C. voltage.

The second pair of arms, only one of which, 36, appears upon FIG. 8, conjointly pivotally mount a hood 55 which may be like item 39, and mounts three rollers each of which is identical with and similarly disposed with its counterpart of the three rollers 42, 43 and 44, previously described, except, of course, that the two principal rollers are disposed to engage the opposite face of sheet 3, from that contacted by rollers 42, 43. A first spring 56 has its ends connected with the central portions of arms 35 and 36. Likewise a second spring 57 is connected with the two arms such as 40, at the other side of the apparatus. These springs act to urge the two sets of rollers into contact with opposite faces of the sheet of glass 3. The point of pivotal connection between arm 35, for example, and hood 39 is substantially in the plane of the axes of rollers 42, 43, and midway between them, so that the rollers are urged with equal force into surface contact with the glass; and the pressure exerted by each roller, upon the glass, is uniform.

Sheet guide 60 has been previously identified. This guide has a central vertical passageway through which sheet 3 may smoothly pass. The edges of the guide are fixed within confronting notches in plates 34, 34a, in a manner clear from FIG. 8, so that the guide acts also to unitarily connect the plates. Slots 62 are provided through both side walls of the guide so that heat may readily pass to the glass.

Figure 10:
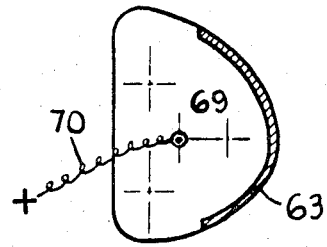
FIG. 10 is a view of a portion of FIG. 9, showing the anode connection to the upper set of rollers of FIG. 9.

A third pair of arms 58, 59 are pivoted at their upper ends on a common horizontal axis, to brackets, not shown, carried by block 31. At their lower ends, these arms conjointly pivotally mount a hood 63. This hood and the three rollers 64, 65 and 66 journaled therein, are in all respects like their counterpart elements previously described, so that it is unnecessary to repeat the description. A fourth pair of arms, not shown, are pivoted at their upper ends of brackets fixed with block 31 and at their lower ends pivotally mount between them a hood 86, like hood 63, and having rollers therein contact with the sheet of glass at the surface thereof opposite rollers 64 and 65. These rollers, upper and lower, may be duplicates of rollers 42 and 43, respectively, previously described, together with an auxiliary roller like 44. Coil springs 67, 68 connect each arm 58, 59 with its counterpart at the other side of the apparatus, and act to urge the rollers of the third and fourth pairs into contact with opposite surfaces of the glass, respectively. Referring to FIG. 10, an electrode 69 is carried at its ends in the end walls of hood 63 and passes midway between the three rollers as clearly shown at FIG. 9. A lead 70 supplies the electrode from the second pole of the same source as that connected with lead 54. It will be understood that each of the two sets of rollers in hoods 55 and 86 are provided with electrodes like 53 and 69, FIG. 9. Thus both upper electrodes such as 69 are connected with the positive pole of the source of D.C., while both lower electrodes such as 53, are connected with the negative pole of the source.

The upper roller of each of the four pairs just described, is connected to be rotated by a source of power, not shown. Thus, roller 42 has a driven shaft 71 (FIG. 8) which extends through the adjacent end wall of hood 39, with its end threaded within opening 48 of plug 47 of roller 42. The other end of the shaft is connected through a universal joint 73 with driving shaft 72. The roller at the other side of the glass, corresponding to roller 42, is similarly connected with shaft 74, to be driven by shaft 75 through universal joint 76. All driven rollers are rotated at the same linear surface velocity and in a direction, for example, as indicated by the arrows upon FIG. 9, to impel the glass upwardly. However, in certain installations the direction of rotation of the rollers may be reversed from that shown and the sheet translated downwardly.

A second hollow guide similar to guide 60 previously described, is mounted by brackets secured to the lower surface of block or frame 31. This guide is mounted to pass centrally through slot 32 and thus acts to accurately guide the sheet in upward movement.

Bearing tube 51 for roller 42 has been described. The tube curves upwardly and at its top end is flared to form a funnel 78 for conductive liquid. The same construction is provided for each of the four driven rollers 64, etc., so that, as clearly shown upon FIG. 8, there are four upwardly-facing funnels 78, 79, 80 and 81. Funnels 78 and 79 are in side-by-side adjacent relation, as are funnels 80, 81. At its top wall, block 31 mounts a pair of pipes 82 and 83 having upwardly-facing funnel-shaped terminals in side-by-side relation. Pipe 82 extends downwardly through frame 31 and at its lower end is branched to form two discharge outlets each over and close to a respective one of funnels 80, 81. Likewise, pipe 83 extends downwardly through the frame and is branched at its lower end to form two discharge outlets each above and close to a respective one of funnels 78, 79. Thus, as molten salt flows from a source, not shown, into the funnels of pipes 82, 83, it passes downwardly and a portion thereof flows into each of the funnels 78 through 80. From these it passes into the respective top rollers and into contact with the glass, as previously described in connection with roller 42. Since the ends of the branches of pipes 82, 83 are out of contact with the funnels into which they discharge, each of the four casing or hood assemblies such as 39, 63, etc., is free for limited independent movement about the pivot axes of its arms. The apparatus is thus self-adjusting for variations in thickness of the sheet and for accommodation to sheets of different thicknesses.

Figure 12:
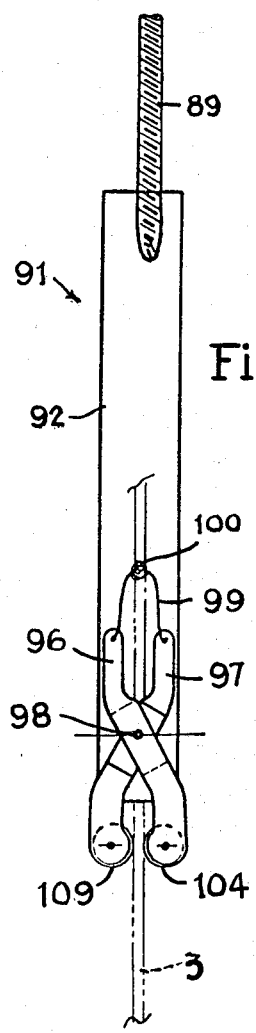
FIG. 12 is a detail side view showing means by which a sheet of glass being treated, may be gripped adjacent its upper edge, by a device forming a cathode connection, and thereby elevated at a relatively slow rate.
Figure 13:
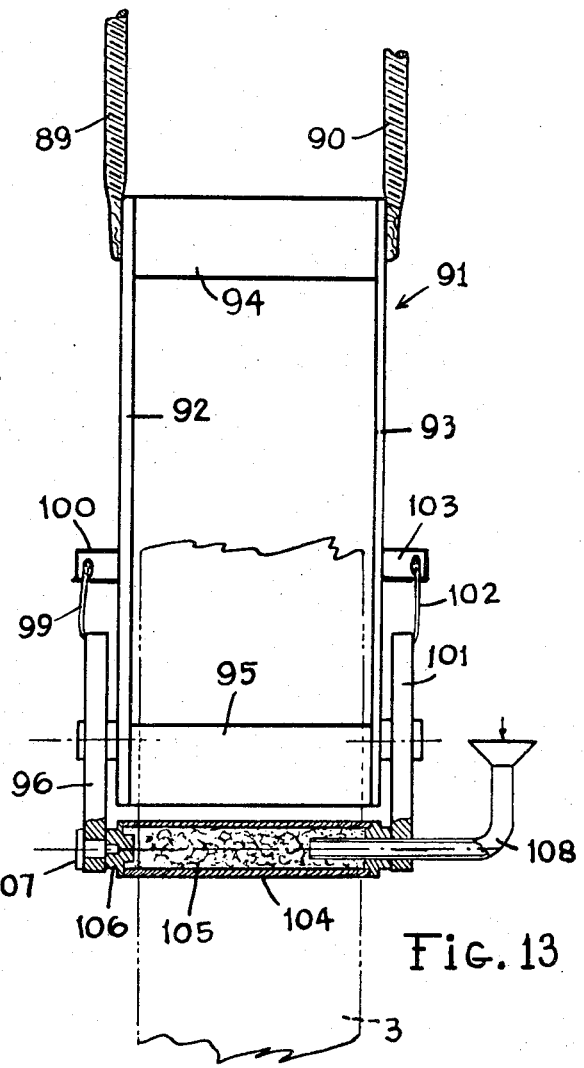
FIG. 13 is a front view corresponding to FIG. 12.

FIGS. 12 and 13 show a commercial form of apparatus for carrying out the inventive method when the article is to be treated by gradual immersion into, or corresponding withdrawal from, a bath of molten salt, in accordance with the procedure described in connection with schematic FIG. 1.

Referring in detail to FIGS. 12 and 13, a pair of parallel threaded feed rods 89, 90, have flattened lower ends secured, as by welding to respectively opposite sides of a rectangular frame generally identified at 91. The rods are engaged by Boston gears, not shown, which are connected for rotation in synchronism and driven by power means so that operation thereof slowly raises or lowers frame 91, as desired, and at a desired rate which may be constant or progressively varied, as selected by correspondingly adjusting the speed of the power means or motor.

Frame 91 comprises side bars 92, 93, rigidly interconnected at top and bottom by cross bars 94, 95, respectively. At their lower ends, each of bars 92, 93 pivotally supports a respective pair of crossed levers. The two pairs are duplicates so that, referring to FIG. 12, levers 96 and 97 are pivoted together and to bar 92, by pivot 98. The upper ends of these levers are urged together by a spring 99, having its central portion fixed in an aperture in stud 100 secured to bar 92, and its ends attached to the adjacent end of a respective one of the levers. The two levers carried by bar 93 are like those just described, and are similarly mounted. These two levers likewise have their upper ends urged together by spring 102, centrally secured in stud 103, fixed with bar 93.

At its lower end lever 96 and its counterpart lever 101 at the other side of frame 91, journal a roller 104 between them. This roller may be constructed similarly to roller 42 previously described and shown in detail upon FIG. 14, so that it is sufficient to identify the tubular cylinder, its interior filling of glass wool 105, solid end plug 106, and pivot pin 107 secured in lever 96 and having a reduced end rotatably fitting the certnal hole in plug 106. At the other end of the roller, pipe 108 passes through and is fixed within a hole in lever 101. At one end the pipe terminates within the roller. Its other end curves upwardly and terminates in a funnel into which molten salt may be introduced for flow to the interior of the roller and seepage through its perforated wall, into the woven glass fiber covering thereof and thus into contact with the glass. The other pair of levers, one of which 97, appears upon FIG. 12, likewise journal a roller 109. This roller is a duplicate of roller 104 and is provided with a pipe like 108 and associated funnel into which molten salt may be introduced for flow to the interior of the roller. Rollers 104, 109 are contiguous and, because of the tension of springs 99 and 102, are urged together to grip a sheet of glass 3 between them. As shown upon FIG. 12, the sheet may have a thickened upper edge to increase the holding power of the rollers upon the sheet.

The operation will be clear from the foregoing description. In the model shown upon FIGS. 12 and 13 the entire assembly of frame 91 and parts carried by or fixed therewith are electrically insulated from associated parts of the apparatus, so that electrical connection form the negative pole of the source may be made to any part of the frame or part carried thereby, to make good connection with the glass through rollers 104, 109 and the molten salt therein. In other words, the construction just described is a commercial embodiment of the schematic arrangement shown upon FIG. 1.

The principle of operation of the apparatus shown upon FIGS. 8 through 11 is basically like the others. When the method is to be carried out by upward movement of the sheet, as indicated by the arrow upon FIG. 8, both upper electrodes such as 69 are connected with the positive pole of the voltage source, and both of the lower ones such as 53, are connected with the negative pole of the source. Since hoods 63 and 86, and all parts directly connected therewith, are electrically insulated from hoods 39 and 55, and related parts, the circuit is completed, for example, from the negative pole of the source, lead 54, electrode 53, molten salt 52, sheet 3, molten salt between and within rollers 64, 65, electrode 69, and lead 70 to the positive pole. Ions thus migrate from the salt between rollers 64, 65 into the surface layers of the glass and there replace a like number of ions originally in the glass. A like function is carried out with respect to the opposite surface of the glass, by the rollers, not shown, in hood 86. As previously stated, the depth of surface hardening and strengthening will depend upon a number of factors such as time of treatment, voltage, current density, rate of movement, and others whose effects are readily determined by test. In the apparatus of FIGS. 8 and 9, the separation of lower roller 65 of the upper trio, from upper roller 46 of the lower trio may be varied by vertical adjustment as a unit of plates 34, 34a and parts carried thereby. Suitable mechanical means such as racks and gears, threaded rod jacks, etc. will be provided for effecting this adjustment from a point exteriorly of the heat-insulating sheathing, not shown, extending between and enclosing blocks 25, 31, and all parts between them. Due to this sheathing, heat loss is kept at a minimum. Molten salt is fed into pipes 82, 83 as required to maintain adequate supply in and between the rollers, as indicated at 52, for example, FIG. 9.

For definiteness of description the method has been described in connection with the replacement by potassium ions, of sodium ions. However, the method is not limited to ions of these particular elements but, to the contrary, may be used for a like purpose to replace, one by another, of ions of elements of the group lithium, sodium, copper, silver, potassium, gold, rubidium, and cesium. Likewise for purposes of clarity of description the invention has been set forth in connection with the treatment of glass in sheet or ribbon form. Nevertheless, it will be clear that the method, particularly as depicted upon FIGS. 1, 12 and 13, is of great utility for the treatment of articles having curved or intricate surfaces, such as rings, cylinders, tubes and, in general, any other shape, form or configuration. With certain changes, the apparatuses shown in FIGS. 4 through 7 and 8 through 11, are useful for the surface treatment of articles of indefinite lengths such as the exterior of tubes, rings, fibers, threads, rods, etc.

It should be particularly noted that the means for feeding liquid, embodied in pipes 82, 83, etc., FIG. 8, enable different liquids to be fed to the rollers in hoods 63 and 86, as distinguished from the like rollers in hoods 39 and 55.

Therefore, the foregoing disclosure is to be taken in an illustrative rather then a limiting sense; and all changes, alterations, substitutions and modifications within the scope of the subjoined claims, are reserved.

I claim:

1. A method of progressively surface tempering a glass article in which ions in the glass are replaceable by larger ions from an electrically conductive bath containing the larger ions by an electric field, which comprises contacting both sides of a first portion of the article with an electrically conductive liquid bath containing the larger ions to be introduced into the article, electrically connecting the positive pole of a source of direct current to said bath, electrically connecting the negative pole of said source of direct current to a second portion of said glass article said second portion being out of contact with said liquid bath, moving the article relative to said liquid bath while maintaining contact between the article and said bath to displace the region of contact of the article and said bath, and maintaining the glass article at a temperature not exceeding the strain point of the glass and at which the glass is electrically conductive.

2. A method according to claim 1, in which the liquid bath contains a molten potassium salt.

3. A method according to claim 2, in which the salt is potassium nitrate and the temperature is about 425° C.

4. The method of surface tempering an article of flat glass having sodium ions, comprising contacting both sides of the article into contact witha liquid bath containing potassium ions, said article being at a temperature not exceeding the strain point of the glass and at a temperature at which the glass is electrically conductive, connecting the negative pole of a source of direct liquid bath, connecting the positive pole of said source of direct current with the liquid bath and effecting relative movement between the article and the bath while maintaining contact therebetween, to progressively traverse on the article the regions of contact between both sides of the article and the bath.

5. The method according to claim 4, in which the article is in sheet form and is initially substantially immersed in the bath, said relative movement being a gradual withdrawal of the article from the bath.

6. The method according to claim 4, in which said relative movement is a gradual introduction of the article into the bath.

7. The method according to claim 4, in which the negative pole of the source of direct current is connected to a second bath of conductive liquid which is in contact with the article in a region of the article spaced from the region contacted by the first bath in the path of movement and at a predetermined distance from the first bath, and maintaining both baths in electrically conductive contact with the article during said relative movement.

8. A method according to claim 1, in which the ions replaced one by another are of metals selected from the group consisting of lithium, sodium, potassium, rubidium, cesium, copper, silver and gold.

9. An apparatus for surface hardening and tempering an article of vitreous material, comprising, a first means including a container confining a liquid source of free ions, and an electrode immersed in the liquid in said container, a second means including a roller having a foraminous wall surface to electrically contact the articles at a first region thereof, means for supplying an electrically conductive liquid to the interior of said roller, for seepage through the foraminous surface into contact with the article, a third means to engage a second region of the article, said third means progressively to advance the article in and along a path in surface contact with the liquid confined in the container of said first means and in contact with said roller, and circuit means for electrically connecting said electrode and said second means with the negative and positive poles, respectively, of a source of direct current.

10. The apparatus according to claim 9, in which the bottom wall of the container of the first means is apertured through which the article may pass to contact the liquid in said container, and the third means comprises a pair of driven rollers arranged to engage the opposite sides of the article and spaced above the bottom of the container, to advance the article along said path and progressively through said aperture into contact with the liquid in said container.

11. The apparatus according to claim 10, in which said pair of driven rollers is immersed in liquid in said container.

12. The apparatus according to claim 9, in which the bottom of said container of the first means is apertured through which the article may pass to contact the liquid in said container and in which there are two masses of heat resistant, liquid absorbing material positioned in said container on opposite sides of said aperture, and foraminous elements are arranged to confined said masses of material in contact with the sides of said article, while permitting seepage therethrough of liquid from the container into contact with the article.

13. The apparatus according to claim 9, in which the container of the first means comprises a set of three rollers journaleld in side-by-side parallel spaced relation, two of said rollers being hollow having foraminous walls and positioned for simultaneous contact with the article at spaced points therealong, and the third roller positioned with axis between the axis of the hollow rollers and spaced from the surface of the article, means for conducting liquid to the interior of said hollow rollers, for seepage through the foraminous walls thereof into contact with the article and the third roller, means for urging said hollow rollers into contact with the article and means for mounting the electrode to contact the liquid.

14. The apparatus according to claim 13 in which at least one of the hollow rollers is driven.

15. The apparatus according to claim 13 in which the second means includes a set of three rollers, journalled in spaced, parallel, side-by-side relation and spaced from the first set of rollers in direct of travel of the article, in which two of said rollers are hollow and have foraminous walls spaced to contact the article, and the third roller is positioned with its axis in a plane between the two hollow rollers, in which the means to supply electrically conductive liquid feeds liquid to both hollow rollers, means for urging both hollow rollers into contact with the article and said electrical connection includes an electrode in the space betwen the three rollers.

16. The apparatus according to claim 15 in which the first means and the second means each comprises two sets of three rollers positioned to contact the article and directly opposite each other, the article being a flat ribbon sheet of glass, each set of three rollers having the construction defined above.

17. The apparatus according to claim 9 in which said roller is filled with a porous mass of heat-resistant liquid absorbent material, and the roller is jacketed with a woven covering of a heat-resistant fiber.

18. The method of surface treating a glass article having two main opposite surfaces by ion exchange, which comprises connecting a region of the article to the first pole of a source of direct current, connecting opposite portions of both said main faces, remote from said first region, with a melt of mineral salts containing ions to be introduced into the glass, connecting said melt to the second pole of said direct current, maintaining said glass article at a temperature at which the glass is electroconductive and at a temperature below the strain point of the glass, effecting relative movement between the article and the melt, while maintaining contact therebetween, to progressively traverse a preselective area of the article to replace ions in the surface of the glass article with larger ions in the melt.

19. The method of surface tempering a sheet of soda-lime glass in an electric field, to simultaneously replace sodium ions on both surfaces of the sheet with potassium ions, comprising immersing a portion of the sheet in a bath of molten potassium salt by suspending the sheet vertically in the bath, connecting the bath with the positive pole of a source of direct current, connecting the unimmersed portion of the sheet with the negative pole of said source of direct current, maintaining said sheet at a temperature below its strain point and at which the glass is conductive to effect a flow of current through the bath and sheet, in series and while said current is flowing, displacing the sheet vertically to cause the plane of intersection of the surface of the bath to traverse the surface area of the sheet to be tempered.

References Cited

UNITED STATES PATENTS

| | | | |
|---|---|---|---|
| 2,596,515 | 5/1952 | Watkins et al. | 204—30 |
| 3,218,220 | 11/1965 | Weber | 161—1 |
| 3,486,995 | 12/1969 | Evers | 204—130 |
| 3,502,022 | 3/1970 | Wood | 65—60 X |
| 3,505,048 | 4/1970 | Plumat | 65—30 |
| 3,505,049 | 4/1970 | Plumat | 65—30 |

ARTHUR D. KELLOGG, Primary Examiner

U.S. Cl. X.R.

65—60, 116, 194, 198; 204—180 R